United States Patent
Gatos et al.

(10) Patent No.: US 12,162,776 B2
(45) Date of Patent: Dec. 10, 2024

(54) METHOD OF PRODUCING MAGNESIUM HYDROXIDE

(71) Applicant: TERNA MAG S.A., Athens (GR)

(72) Inventors: Konstantinos G. Gatos, Chalkida (GR); Pantelis Baxevanidis-Taros, Marousi Attikis (GR); Filippos Boukas, Athens (GR); Emmanouel Tsontakis, Gerakas Attikis (GR)

( * ) Notice: Subject to any disclaimer, the term of this patent is extended or adjusted under 35 U.S.C. 154(b) by 788 days.

(21) Appl. No.: 17/259,247

(22) PCT Filed: Jul. 4, 2019

(86) PCT No.: PCT/GR2019/000047
§ 371 (c)(1),
(2) Date: Jan. 11, 2021

(87) PCT Pub. No.: WO2020/012202
PCT Pub. Date: Jan. 16, 2020

(65) Prior Publication Data
US 2021/0300775 A1  Sep. 30, 2021
US 2022/0153602 A9  May 19, 2022

(30) Foreign Application Priority Data
Jul. 12, 2018  (GR) .............................. 20180100313

(51) Int. Cl.
*C01F 5/16* (2006.01)

(52) U.S. Cl.
CPC ............ *C01F 5/16* (2013.01); *C01P 2004/51* (2013.01); *C01P 2006/12* (2013.01); *C01P 2006/80* (2013.01)

(58) Field of Classification Search
CPC ....................................................... C01F 5/16
See application file for complete search history.

(56) References Cited

U.S. PATENT DOCUMENTS

| | | |
|---|---|---|
| 4,098,762 A | 7/1978 | Miyata et al. |
| 5,843,389 A | 12/1998 | Elsner et al. |

FOREIGN PATENT DOCUMENTS

| | | |
|---|---|---|
| CA | 2032470 C | 5/2000 |
| EP | 0568488 A2 | 3/1993 |
| EP | 0599085 A1 | 1/1994 |
| GR | 20080100407 B | 10/2009 |
| WO | 2008146089 A2 | 12/2008 |

*Primary Examiner* — James A Fiorito

(57) ABSTRACT

The current invention relates to a process for producing magnesium hydroxide. Said magnesium hydroxide is suitable for mixing with polymers and for inducing flame retardant properties in polymeric compounds. According to aspects of the invention a magnesium oxide containing material is hydrated at high temperatures and pressures. The hydroxide containing material can be further dried and milled.

8 Claims, No Drawings

METHOD OF PRODUCING MAGNESIUM HYDROXIDE

FIELD OF THE INVENTION

Current invention relates to a process for producing magnesium hydroxide.

More particularly, this invention is directed to a method of producing magnesium hydroxide suitable for mixing with polymers. Said magnesium hydroxide is especially appropriate for inducing flame retardant properties in polymeric compounds being at the same time an environmental friendly filler.

BACKGROUND OF THE INVENTION

EP 0 599 085 discloses a process for producing magnesium hydroxide by wet-pulverizing a light burned magnesia followed by its hydration in presence of an alkaline aqueous medium at a temperature of not less than 70° C. and preferably below 120° C. In order to improve the hydration rate, the pH of the reaction is not less than 11. On the one hand, light burned magnesia bears increased porosity and on the other hand, the extended wet-pulverizing during hydration may create further uneven particle surfaces putting at stake desirable flame retardant crystal structures.

EP 0 568 488 presents a particulate magnesium hydroxide with specific surface (BET) of 13-30 $m^2/gr$ and average particle size 0.3-1.0 μm. These flame retardant have been produced by the calcination of a magnesium feedstock, which has a specific surface of 3-10 $m^2/gr$, followed by its hydration and milling for achieving the desirable particle size. In general, magnesium hydroxide with BET values above 13 $m^2/gr$ is expected to induce difficulties in mixing with polymers increasing the viscosity of the compound.

CA 2 032 470 presents a magnesium hydroxide of average grain size less than 10 μm and low content of impurities within the magnesia suitable for flame retardant applications. However, the claimed process is energy intensive involving apart from leaching with strong acids, spray roasting of a magnesium chloride solution, as well as, subsequent post-washes.

U.S. Pat. No. 4,098,762 refers to magnesium hydroxide particles coated with an anionic surface active agent. These particles have a specific surface of less than 20 $m^2/gr$. Said magnesium hydroxide has been produced by hydrothermal treatment at elevated temperature and pressure of basic magnesium chloride or magnesium nitrate in an aqueous medium. Besides the prerequisite of a coating agent for producing said particles, above method involves extended retention time of the solution within the autoclave in order to bring the properties at the desired level.

U.S. Pat. No. 5,843,389 describes a process for producing magnesium hydroxide of low particle size and specific surface from solution by precipitation. Said process includes subsequent stages of leaching a magnesium-containing ore, purification, filtration and hydrothermal treatment in an autoclave. Special care has been taken for the handling and recycling of the chemical by-products formed due to leaching.

GR 20080100407 discloses the production of magnesium hydroxide from hard burned magnesia. Said process involves at least two stages of hydration at a temperature of 50-100° C. for 15-24 hours each, in order to obtain the desired properties for flame retardant applications. Apart from the long lasting hydration process, said method demands the presence of magnesium salts.

Prior art relates either to energy-intensive procedures and time-consuming methods or to necessary additives and by-product handling concerns, which all complicate magnesium hydroxide production, raise environmental issues and increase cost. The object of the present invention is to overcome the problems mentioned above.

SUMMARY OF THE INVENTION

According to the present invention, a method of producing magnesium hydroxide is provided. In a first aspect of the invention, the method comprising hydrating a magnesium oxide containing material at high temperatures and pressures, resulting in a magnesium hydroxide containing material.

In a second aspect of the invention, the magnesium oxide containing material has a specific surface of more than 0.1 $m^2/gr$ and lower than 25 $m^2/gr$.

In a third aspect of the invention, the method comprising the steps of (i) hydrating a magnesium oxide containing material at high temperatures and pressures, resulting in a magnesium hydroxide containing material, (ii) drying the magnesium hydroxide containing material, and (iii) milling.

In a forth aspect of the invention, hydration is taking place at a temperature between 120° C. and 350° C. and a pressure between 2 bar and 165 bar.

In a fifth aspect of the invention, the magnesium hydroxide containing material comprising particles, wherein said particles present a specific surface of more than 1 $m^2/gr$ and less than 20 $m^2/gr$.

In a sixth aspect of the invention, the magnesium hydroxide comprising particles of $d_{50}$ of more than 0.5 μm and less than 20 μm.

In a seventh aspect of the invention, the magnesium hydroxide containing material is suitable for mixing with polymers and presents flame retardant properties.

DETAILED DESCRIPTION OF THE INVENTION

It should be noted that all embodiments and preferred features of the present invention recited herein may apply to the above-mentioned aspects of the invention and may be combined as appropriate.

The magnesium containing material, which will be used for receiving the magnesium oxide containing material of the present invention is any available magnesium source. Preferably, said magnesium containing material is any mineral known in the art such as magnesium carbonate, periclase, brucite and the like. In specific embodiments, the initial magnesium containing material is a mixture of various chemical structures. Preferably, the magnesium containing material is a natural ore such as magnesite, serpentine, brucite and the like. In special embodiments the magnesium oxide containing material of said invention has been produced by agglomerating, pelletizing or briquetting mixtures of powders of magnesium containing materials with known means in the art. In specific embodiments, it is preferred the selection of magnesium-rich containing materials for receiving a magnesium oxide of increased purity. In special embodiments the magnesium oxide content in the magnesium oxide containing material (purity) is more than 80% (loss-free—XRF analysis) or more than 85%, preferably more than 90% most preferably more than 92% such as 94%, 97%, 95% and the like.

The magnesium oxide containing material used for the present invention can be produced by known means in the art such as muffle furnace, multiple-hearth furnace, rotary kiln, electro-fusion, shaft kiln, and the like. In preferred embodiments, the magnesium oxide containing material used for the present invention has been produced by calcining said magnesium containing material at a temperature higher than 700° C. and lower than 2000° C. Preferably, the temperature was higher than 900° C. and lower than 1900° C. and most preferably the temperature was higher than 1100° C. and lower than 1800° C. In specific embodiments the calcination temperature was higher than 1300° C. or higher than 1500° C. Preferably, the magnesium oxide used for the present invention has not been produced by hydropyrolysis, magnesium chloride or magnesium nitrate sources.

In specific embodiments it has been proven beneficial the sintering of magnesium oxide containing material. By this way, the magnesium oxide crystal is increased. Furthermore, its specific surface and reactivity are decreased, accordingly. More specifically, the specific surface as measured by BET method, is more than 0.1 $m^2/gr$ and less than 25 $m^2/gr$, such as 15 $m^2/gr$, 19 $m^2/gr$, 22 $m^2/gr$, 12 $m^2/gr$, 4 $m^2/gr$, 9 $m^2/gr$ and the like. Preferably specific surface is more than 0.2 $m^2/gr$ and less than 10 $m^2/gr$. In specific embodiments the specific surface is more than 0.2 $m^2/gr$ and less than 7.5 $m^2/gr$, preferably more than 0.2 $m^2/gr$ and less than 5 $m^2/gr$. In special embodiments the specific surface is more than 0.3 $m^2/gr$ and less than 3 $m^2/gr$. It is not obvious for someone ordinary skilled in the art to use hard burned magnesium oxide of low specific surface for hydration due to the fact that it would increase considerably the hydration time, would deliver low productivity and would require additives for improving process. In special embodiments, the BET value of magnesium oxide used for hydration in the present invention is lower than 2.9 $m^2/gr$ such as 2.0 $m^2/gr$, 0.5 $m^2/gr$, 1.5 $m^2/gr$ and the like.

The magnesium oxide containing material of the present invention presents 0-10 mm particle size distribution. Preferably said magnesium oxide containing material has a 0-5 mm particle size distribution, preferably 0-2 mm, more preferably 0-1.5 mm, most preferably 0-1 mm. In specific embodiments said magnesium oxide containing material presents 0-0.8 mm particle size distribution and most specifically 0-0.5 mm particle size distribution. In special embodiments said magnesium oxide containing material has $d_{50}$ less than 300 μm, such as 100 μm, 200 μm, 75 μm, 150 μm, 25 μm, 35 μm and the like. In special embodiments, said particles pass through a 120 mesh screen. The magnesium oxide containing material of the present invention has $d_{10}$ more than 0.5 μm, preferably more than 1 μm. In preferred embodiments said $d_{10}$ is more than 3 μm or more than 5 μm. In special embodiments said magnesium oxide containing material has $d_{50}$ more than 10 μm, preferably more than 15 μm. In special cases said magnesium oxide containing material has $d_{50}$ more than 20 μm. In contrast to other methods presented in the art, current invention works also with coarse particles without special limitations on particle size distribution or need of surfactants. Current invention does not require slurry stabilization. In the art, specific and well-defined viscosity ranges are usually required for the suspension, which is going to be processed. In many cases, said suspensions proposed in the art require surfactants for achieving processing. In these cases, wet milling has been suggested for stabilizing the slurry.

The hydration of said magnesium oxide is taking place preferably at high temperatures and pressures. It is preferred a temperature of more than 110° C. and less than 350° C., preferably more than 130° C. and less than 330° C. or even 320° C., preferably more than 140° C. and less than 300° C. and most preferably more than 150° C. and less than 290° C. In preferred embodiments the hydration temperature is more than 160° C. and less than 280° C. or even 270° C. In special embodiments the hydration temperature is more than 170° C. or more than 180° C. and less than 260° C. The pressure is regulated by the water vapor, accordingly. In specific embodiments pressure is more than 2 bar, preferably more than 5 bar, most preferably more than 11 bar. In special embodiments, the pressure in the reactor is further increased by external methods such as pressurized gas. Hydration pressure is preferably lower than 165 bar such as 90 bar, 30 bar, 60 bar and the like. In special cases the internal pressure is increased by the use of suitable solvents.

The in weight content of the magnesium oxide containing material in the aqueous solution is more than 1% and less than 100%. Preferably said solid content is more than 2% and less than 70% in weight, more preferably more than 5% and less than 50% in weight, such as 25%, 40% and the like. The required time of hydration within the reactor is less than 12 h, preferably less than 8 h, preferably less than 6 h, preferably less than 4 h, more preferably less than 3 h, most preferably less than 2 h such as 30 min, 1 h, 15 min, 5 min and the like. Hydration is taking place either in batch reactor or at continuous process. In special cases, hydration is taking place in combinations thereof. The advantages of the process of the present invention over prior art are numerous. Hydration at high temperature and pressure compared to atmospheric conditions for a magnesium oxide containing material assist the finalization of the hydration within a reasonable timeframe. Surprisingly, the increased temperature and pressure assist the production of magnesium hydroxides of low BET values without the absolute need of additives during hydration. Current invention does not require presence of chloride ions. In preferred embodiments chlorine ions are lower than 0.02 wt. % of the dry magnesium oxide containing material such as 0.01 wt %, 0.001 wt. %, 0.005 wt. % and the like. Chloride ions are known to be corrosive. In other prior art methods, hydration of a magnesium containing solution in an autoclave requires extended time for creating adequate magnesium hydroxide material particles of low BET values suitable for mixing with polymers. Current invention solves this issue by hydrating a magnesium oxide containing material particles, which initially have low BET value and transform them to a magnesium hydroxide of low BET value in suspension. Surprisingly, the magnesia of the present invention when hydrated in an autoclave produces magnesium hydroxide, which succeeds low BET values and particle sizes. On the contrary magnesia with BET values higher than 25 $m^2/gr$ even when hydrated in reactor does not produce the magnesium hydroxide with the desired characteristics described in current invention. Moreover, it has been found that presence of very low particles sizes in the magnesium oxide containing material which was going to be hydrated produced magnesium hydroxide containing material with higher BET values than desired.

The hydration of the magnesium oxide of the present invention does not require any hydrating agent. In special embodiments, said hydration can be performed in presence of hydrating agents such as hydrochloric acid, nitric acid, acetic acid, citric acid, formic acid, magnesium nitrate, magnesium chloride, ammonium chloride, magnesium acetate, sodium acetate and the like. Preferably, present invention does not exploit sodium hydroxide during hydration. Preferably, current invention does not require the presence of ammonium chloride.

The process of the present invention involves drying by any mean that does not increase the specific surface of the magnesium hydroxide by more than 40%, not more than 30%, preferably not more than 20%, preferably not more than 10%. in preferred embodiments, drying does not increase the specific surface of the magnesium hydroxide. The initial reference specific surface of the magnesium hydroxide is measured by taking part of the precipitated suspension after hydration and drying it in an oven at 120° C. under static conditions. It has been disclosed that drying in a long gap mill increased the BET value of the magnesium hydroxide up to 40% compared to the initial BET value in the slurry. The drying process can be performed by any mean in the art and combinations thereof, such as vacuum filter, pressure filter, spray dryer, paddle dryer, drum dryer, freeze dryer, fluidized-bed dryers and the like. In preferred cases, drying does not include crushing or milling at the same time. In specific embodiments, current invention does not involve drying in a long gap mill. The magnesium hydroxide containing material, which is directed to drying can be in slurry or cake form. Preferably, the drying process of the present invention does not involve spray drying of the magnesium hydroxide slurry. This latter drying method performs low-yield and it is energy-intensive. Present invention has advantages over prior art as it does not require the use of dispersing agents and well-defined range of particle size distribution in the slurry.

The magnesium hydroxide containing material of the present invention holds the majority of the impurities of the magnesium oxide containing material. The process of the present invention does not require filtering for removing impurities. Impurities are mostly encapsulated in the magnesium hydroxide containing material without affecting adversely the hydration process. Impurities are less than 20% and more than 0.5% (loss-free—XRF analysis), preferably less than 10% and more than 1%, such as 8%, 4%, 6%, 2% and the like. Nevertheless, optional conventional beneficiation processes are combined with present invention if purity increase is required. Preferably, present invention does not include complex formers during hydration for improving purity. Additives such as hydroxylamine, ammonium salts, ethylenediaminetetraacetic acids or nitryltriacetic acids are not required for current invention. Moreover, other methods presented in prior art, which involve leaching must include plenty of post washes, purifications and filtering to remove the dissolved impurities and the by-products in order to produce a magnesium hydroxide suitable for mixing with polymers. It is obvious that all these steps burden the environment with chemical waste management. Current invention successfully overcomes these problems.

The process of the present invention involves milling by any mean that does not increase the specific surface of the magnesium containing material by more than 100%, 50%, 40% or 30%, preferably not more than 20%, preferably not more than 10%. Each reference specific surface value of the magnesium containing material is measured each time by taking part of the dried magnesium containing material before each fine milling step. The magnesium containing material can be magnesium oxide, magnesium carbonate, magnesium hydroxide and the like. The process of the present invention involves milling by any mean that does not increase the specific surface of the magnesium hydroxide by more than 40%, not more than 30%, preferably not more than 20%, preferably not more than 10%. Preferably, milling does not increase the specific surface of the magnesium hydroxide. In special embodiments of current invention, the specific surface of the grinded magnesium hydroxide is lower than prior its milling. Drying and milling in a long gap mill as presented in WO 2008/146089 increased the BET value of the magnesium hydroxide up to 40% compared to the initial BET value in the slurry. The milling can be performed in wet or dry conditions, exploiting equipment such as ball mill, agitated bead mil, jet mill, long gap mill, pin mill, pendulum roller mill, disk mill and the like. In some embodiments, milling is performed at the dried magnesium hydroxide containing material. In other embodiments, milling is performed at the wet magnesium hydroxide containing material. In special embodiments, milling is performed at both the wet and the dry magnesium hydroxide containing material. In specific embodiments, current invention does not involve milling in a long gap mill. In the art, the extended milling time, which is applied in order to reduce the particle size, induces a considerable increase of the specific surface of the mineral. In specific embodiments, current invention exploits short time for milling with enhanced particle-to-particle attrition, thus balancing the specific surface increase of the mineral. In other embodiments milling is performed at the magnesium oxide containing material prior to hydration. In some embodiments, milling is performed both at the magnesium oxide containing material prior to hydration and the magnesium hydroxide containing material after hydration. The particle size reduction that is taking place during hydration in reactor is likely due to crystal transformation, shearing and platelet exfoliation. Needless to say that hydro-cyclones, screening, sieving, air-cyclones, sorters, classifiers and the like, are equipment that can be combined with current invention. According to the present invention, is disclosed a method of producing magnesium hydroxide comprising the steps of (i) hydrating a magnesium oxide containing material at a temperature between 120° C. and 350° C. resulting in magnesium hydroxide containing material, (ii) drying the magnesium hydroxide containing material, (iii) milling the magnesium containing material. The steps of the invention are not necessarily executed in that particular order.

The dried magnesium hydroxide containing material has particles with $d_{90}$ of more than 1.5 and less than 50 μm, preferably more than 2.0 μm and less than 30 μm, preferably more than 2.2 μm and less than 20 μm. In special embodiments $d_{90}$ is less than 10 μm, less than 8.0 μm or less than 6.0 μm. The dried magnesium hydroxide containing material of present invention has particles with $d_{50}$ of more than 0.5 and less than 20 μm, preferably more than 1.0 μm and less than 15 μm, most preferably more than 1.1 μm and less than 10 μm or even 8 μm. In special embodiments $d_{50}$ is more than 1.3 μm or more than 1.5 μm and less than 5.0 μm or less than 3.5 μm. In specific embodiments, particles with $d_{50}$ of more than 10 μm are produced such as 20 μm, 30 μm, 25 μm, 18 μm, 35 μm and the like. In preferred embodiments the average particle size of said dried magnesium hydroxide containing material is more than 1.5 μm and less than 20 μm. In general, a low average particle size is required for mixing with polymers. However, a great presence of fines lower than 1.0 μm makes harder the compounding with polymers as the viscosity during melt mixing increases. The $d_{10}$ of the magnesium hydroxide containing material of the present invention as measured by laser diffraction in suspension (Malvern Mastersizer equipment) is more than 0.3 μm and less than 5.0 μm, preferably more than 0.5 μm and less than 3.0 μm. In specific embodiments, $d_{10}$ is more than 0.7 μm, such as 1.1 μm, 0.9 μm, 1.0 μm and the like. It is an advantage of the current invention compared to other methods in the art that produces a low amount of fines. The magnesium hydroxide containing material of the present invention has a narrow particle size distribution suitable for mixing with polymers.

The dried magnesium hydroxide containing material comprising particles presenting a specific surface (BET) of more than 0.5 m$^2$/gr and less than 20 m$^2$/gr, preferably more than 1 m$^2$/gr and less than 18 m$^2$/gr, preferably more than 2 m$^2$/gr and less than 15 m$^2$/gr, more preferably more than 3 m$^2$/gr and less than 13 m$^2$/gr. In preferred embodiments said specific surface is less than 12.9 m$^2$/gr, such as 5 m$^2$/gr, 10 m$^2$/gr, 12 m$^2$/gr, 12.5 m$^2$/gr, 4 m$^2$/gr, 7.5 m$^2$/gr and the like. A low BET value of said dried magnesium hydroxide containing material is appropriate for mixing with polymers enabling better dispersion and high filler loadings.

The degree of conversion of magnesium oxide containing material to magnesium hydroxide containing material should be appropriately adequate for each application. For flame retardant applications the degree of conversion should be more than 70%, preferably more than 80%, such as 85%, 91%, 88%, 96% and the like. Most preferably the degree of conversion is more than 90%. The degree of conversion is calculated as the percentage of the MgO (measured in XRF) in the magnesium oxide containing material that has been converted to magnesium hydroxide.

The magnesium hydroxide containing material according to the present invention can be coated with surface modifiers such as fatty acids, amino-, alkyl- or vinyl- silanes, siloxanes, stearates, titanate or zirconate coupling agents, maleic anhydrite grafted polymers and the like. The coating can be applied in wet or dry conditions by any method known in the art. In special cases the BET value of the magnesium hydroxide can be further reduced compared to the uncoated material due to the presence of surface modifiers.

The magnesium hydroxide containing material of the present invention is suitable for mixing with polymers. Preferably, said magnesium hydroxide containing material contains already a high amount of magnesium hydroxide (e.g. degree of conversion more than 70%, preferably more than 85%, most preferably more than 90%) prior its mixing with the polymers. The range of polymers includes both synthetic and natural ones involving thermoplastics, thermosets and elastomers. Such polymers involve polyethylenes, polypropylenes, α-olefins, ethylene-acrylate copolymers, ethylene-vinyl acetate copolymers, polyvinyl chlorides, polyamides, epoxy resins, polyester resins, natural rubber, butyl rubber, ethylene-propylene rubber, acrylic rubber, nitrile rubber, and the like. The magnesium hydroxide containing material of the present invention is suitable for mixing with polymers and various polymer blends thereof.

The magnesium hydroxide containing material according to the present invention induces flame retardant properties in the polymer compound. Beneficial on said properties is purity and high degree of conversion. Present invention exploits a broad spectrum of purities, while is able to achieve a high degree of conversion. Said magnesium hydroxide is a halogen-free flame retardant mineral.

It is noted that for a person skilled in the art that combining elements of this invention will generate properties, which are not explicitly mentioned in this description, but which are in the scope of this invention.

The following non-limiting examples demonstrate some magnesium hydroxide powders of the present invention. The hydration conditions referred therein are indicative and were employed for comparison reasons.

EXAMPLES

Example 1

A magnesium oxide containing material with 91% purity, which was dry grinded at $d_{50}$ of 300 μm and presenting a BET value of 2.2 m$^2$/gr, was hydrated in distilled water at 10 wt. % solid content in reactor at 190° C. for 2 h. The vacuum filtering of the suspension and oven drying of the solid, which was followed resulted in a magnesium hydroxide containing material (90% conversion) with BET=11.9 m$^2$/gr and $d_{50}$ of 22.9 μm Example 2

A magnesium oxide containing material with 93% purity, which was grinded at $d_{50}$ of 28 μm and presenting a BET value of 0.7 m$^2$/gr, was hydrated in distilled water at 10 wt. % solid content in reactor at 190° C. for 2 h. The vacuum filtering of the suspension and oven drying of the solid, which was followed resulted in a magnesium hydroxide containing material (89% conversion) with BET=9.0 m$^2$/gr and $d_{50}$ of 14.3 μm Example 3

A magnesium oxide containing material with 96% purity, which was dry grinded at $d_{50}$ of 55 μm and presenting a BET value of 0.8 m$^2$/gr, was hydrated in distilled water at 10 wt. % solid content in reactor at 190° C. for 2 h. The vacuum filtering of the suspension and oven drying of the solid, which was followed resulted in a magnesium hydroxide containing material (91% conversion) with BET=11.6 m$^2$/gr and $d_{50}$ of 3.7 μm Example 4

A magnesium oxide containing material with 96% purity, which was dry grinded at 0-1 mm particle size distribution and presenting a BET value of 11.7 m$^2$/gr, was hydrated in distilled water at 10 wt. % solid content in reactor at 190° C. for 2 h. The oven drying of the precipitate resulted in a magnesium hydroxide containing material (95% conversion) with BET=12.9 m$^2$/gr and $d_{50}$ of 114 μm, while dry grinding of the solid in a vibrational cup mill delivered a magnesium hydroxide containing material with BET=13.5 m$^2$/gr and $d_{50}$ of 12.1 μm Comparative Example 1

A magnesium oxide containing material with 96% purity, which was dry grinded at $d_{50}$ of 75 μm and presenting a BET value of 7.5 m$^2$/gr, was hydrated in distilled water at 10 wt. % solid content at 80° C. for 24 h. The vacuum filtering of the suspension and oven drying of the solid, which was followed resulted in a magnesium hydroxide containing material (88% conversion) with BET=20.8 m$^2$/gr and $d_{50}$ of 11.5 μm Comparative Example 2

A magnesium oxide containing material with 96% purity, which was dry grinded at $d_{50}$ of 4.5 μm and presenting a BET value of 31.7 m$^2$/gr, was hydrated in distilled water at 10 wt. % solid content in reactor at 190° C. for 2 h. The freeze drying of the suspension, which was followed resulted in a magnesium hydroxide containing material (93% conversion) with BET=20.1 m²/gr and $d_{50}$ of 5.5 μm The scope of the invention is defined in the appended claims.

The invention claimed is:

1. A method of producing a magnesium hydroxide containing material, comprising:
   hydrating a magnesium oxide containing material at a temperature between 120° C. and 350° C. to produce the magnesium hydroxide containing material, wherein the magnesium oxide containing material presents a specific surface of more than 0.1 m²/gr and less than 25 m²/gr;
   drying the magnesium hydroxide containing material; and
   milling the magnesium containing material,
   wherein the dried magnesium hydroxide containing material further comprises particles with a $d_{50}$ of more than 0.5 μm and less than 35 μm and the dried magnesium hydroxide containing material comprising particles presenting a specific surface of more than 1 m²/gr and less than 20 m²/gr.

2. The method according to claim 1, wherein the magnesium oxide containing material used for hydration has purity of more than 80%.

3. The method according to claim 1, wherein the magnesium oxide containing material used for hydration has been produced by calcining a magnesium containing material at a temperature higher than 900° C. and lower than 1900° C.

4. The method according to claim 1, wherein the magnesium oxide containing material used for hydration presents particle size distribution of 0-1 mm.

5. The method according to claim 1, wherein the magnesium oxide containing material used for hydration presents $d_{10}$ of more than 0.5 μm.

6. The method according to claim 1, wherein the hydration is taking place at a temperature of more than 130° C. and less than 330° C.

7. The method according to claim 1, wherein the magnesium hydroxide containing material presents a degree of conversion more than 80%.

8. The method according to claim 1, wherein the magnesium hydroxide containing material comprising particles with $d_{50}$ of more than 0.5 and less than 10 μm.

* * * * *